United States Patent
Hiranabe et al.

(10) Patent No.: US 9,381,472 B2
(45) Date of Patent: Jul. 5, 2016

(54) CARBON-DIOXIDE-SEPARATING MEMBRANE

(71) Applicant: Toray Industries, Inc., Tokyo (JP)

(72) Inventors: Ryuichiro Hiranabe, Otsu (JP);
Masayuki Hanakawa, Otsu (JP);
Tomonori Kawakami, Otsu (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 14/403,661

(22) PCT Filed: May 30, 2013

(86) PCT No.: PCT/JP2013/065044
§ 371 (c)(1),
(2) Date: Nov. 25, 2014

(87) PCT Pub. No.: WO2013/180218
PCT Pub. Date: Dec. 5, 2013

(65) Prior Publication Data
US 2015/0165390 A1 Jun. 18, 2015

(30) Foreign Application Priority Data
May 30, 2012 (JP) .................... 2012-123145

(51) Int. Cl.
| | | |
|---|---|---|
| *B01D 53/22* | (2006.01) | |
| *B01D 71/60* | (2006.01) | |
| *B01D 71/56* | (2006.01) | |
| *B01D 67/00* | (2006.01) | |
| *B01D 63/08* | (2006.01) | |
| *B01D 71/80* | (2006.01) | |
| *C08G 69/32* | (2006.01) | |
| *C08G 69/40* | (2006.01) | |
| *C10L 3/10* | (2006.01) | |
| *B01D 69/02* | (2006.01) | |
| *B01D 71/58* | (2006.01) | |

(52) U.S. Cl.
CPC .............. *B01D 71/80* (2013.01); *B01D 53/228* (2013.01); *B01D 63/081* (2013.01);
(Continued)

(58) Field of Classification Search
CPC .............. B01D 53/228; B01D 63/081; B01D 67/0088; B01D 67/0013; B01D 67/0018; B01D 71/56; B01D 71/60; B01D 71/80; B01D 2256/22; B01D 2257/504; C08G 69/32; C08G 69/40; C10L 3/104; Y02C 10/10
USPC ..................................... 95/51; 96/5
See application file for complete search history.

(56) References Cited

U.S. PATENT DOCUMENTS 5,076,817 A * 12/1991 Hayes .................... B01D 71/56
95/51
5,085,676 A * 2/1992 Ekiner .................... B01D 71/56
96/10
(Continued)

FOREIGN PATENT DOCUMENTS

| CN | 1723074 | 1/2006 |
| CN | 101910314 | 12/2010 |

(Continued)

OTHER PUBLICATIONS

English language machine translation of JP 2014-14728. Retrieved from http://worldwide.espacenet.com on Nov. 19, 2015.*
Office Action dated Oct. 22, 2015 of corresponding Chinese Application No. 201380028451.X along with an English translation.

*Primary Examiner* — Jason M Greene
(74) *Attorney, Agent, or Firm* — DLA Piper LLP (US)

(57) ABSTRACT

A carbon dioxide separation membrane includes a skin layer having a function of separating carbon dioxide from a mixed gas, wherein the skin layer contains 30 to 90% by mass of a polymer resin in which a difference between an affinity to carbon dioxide and an affinity to at least one of hydrogen and helium, the affinities are expressed as free energy ΔG (kcal $mol^{-1}$), is 4.5 kcal $mol^{-1}$ or more and less than 10 kcal $mol^{-1}$, and from 10 to 70% by mass of an organic liquid having an affinity to carbon dioxide.

10 Claims, 1 Drawing Sheet

(52) U.S. Cl.
CPC ....... *B01D 67/0013* (2013.01); *B01D 67/0018* (2013.01); *B01D 67/0088* (2013.01); *B01D 69/02* (2013.01); *B01D 71/56* (2013.01); *B01D 71/58* (2013.01); *B01D 71/60* (2013.01); *C08G 69/32* (2013.01); *C08G 69/40* (2013.01); *C10L 3/104* (2013.01); *B01D 2252/204* (2013.01); *B01D 2256/16* (2013.01); *B01D 2256/18* (2013.01); *B01D 2256/22* (2013.01); *B01D 2257/108* (2013.01); *B01D 2257/11* (2013.01); *B01D 2257/504* (2013.01); *B01D 2258/0283* (2013.01); *B01D 2323/08* (2013.01); *B01D 2323/12* (2013.01); *B01D 2325/20* (2013.01); *C10L 2290/548* (2013.01); *Y02C 10/10* (2013.01); *Y02P 20/152* (2015.11)

(56) References Cited

U.S. PATENT DOCUMENTS

| | | | |
|---|---|---|---|
| 5,281,254 A * | 1/1994 | Birbara | B01D 53/22 95/51 |
| 7,601,202 B2 | 10/2009 | Noack et al. | |
| 8,197,576 B2 | 6/2012 | Okada et al. | |
| 8,377,170 B2 | 2/2013 | Okada et al. | |
| 8,617,297 B2 | 12/2013 | Okada et al. | |
| 8,715,392 B2 * | 5/2014 | Liu | B01D 53/228 95/51 |
| 8,992,668 B2 * | 3/2015 | Sano | B01D 53/228 95/51 |
| 2010/0313752 A1 | 12/2010 | Powell et al. | |

FOREIGN PATENT DOCUMENTS

| | | | |
|---|---|---|---|
| CN | 101925397 | 12/2010 | |
| CN | 102430396 | 5/2012 | |
| JP | 03-267130 A | 11/1991 | |
| JP | 2001-120940 A | 5/2001 | |
| JP | 2001-519711 | 10/2001 | |
| JP | 2008-36463 * | 2/2008 | ............. B01D 71/38 |
| JP | 2008-036463 A | 2/2008 | |
| JP | 2009-006260 | 1/2009 | |
| JP | 2009-034614 | 2/2009 | |
| JP | 2011-083721 A | 4/2011 | |
| JP | 2011-123874 A | 6/2011 | |
| JP | 2014-14728 * | 1/2014 | ............. B01D 53/22 |
| WO | 2012/060229 A1 | 5/2012 | |
| WO | WO 2012/060229 A1 * | 5/2012 | ............. B01D 53/22 |

* cited by examiner

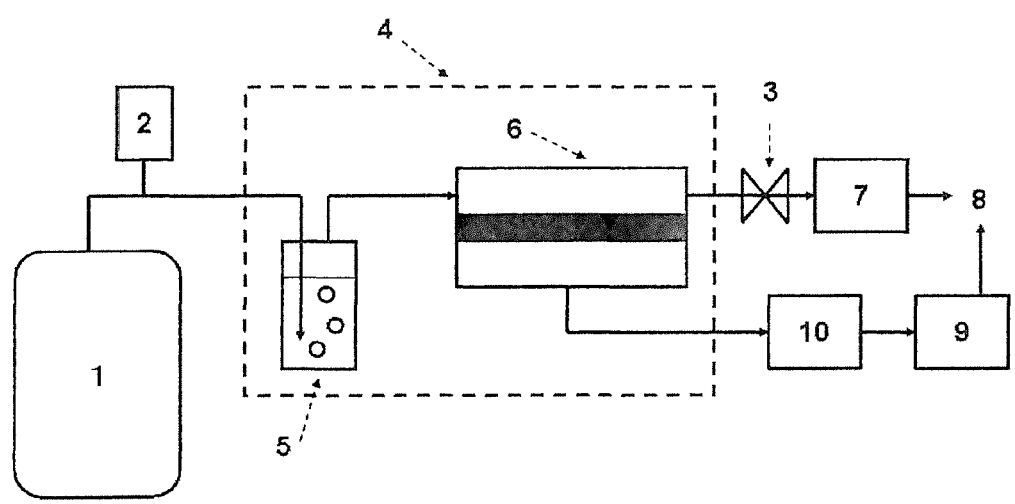

CARBON-DIOXIDE-SEPARATING MEMBRANE

TECHNICAL FIELD

This disclosure relates to a carbon dioxide separation membrane that separates, concentrates and recovers high concentration carbon dioxide from a mixed gas such as natural gas or combustion gas.

BACKGROUND

A membrane separation method of selectively permeating an objective gas utilizing the difference in gas permeability of a material is noticed as a method of concentrating a specific gas from a mixed gas. Because a mixed gas supplied often has high temperature and high pressure, an inorganic membrane such as a carbon membrane (for example, JP-A-2009-34614) or a ceramic membrane (for example, JP-A-3-267130) is the main stream as a membrane material. However, a polyimide membrane having high heat resistance and pressure resistance can be exemplified as a practical polymer membrane.

Particularly in recent years, the demand of a technology to separate, concentrate and recover carbon dioxide from natural gas and combustion gas is increased because of global warming. A gas to be treated in the technology undergoes modification of water vapor and aqueous gas shift and, therefore, contains carbon dioxide and hydrogen as main components. Gas permeability of the membranes described above is that hydrogen having small molecular size permeates faster than carbon dioxide and, therefore, it is impossible to selectively extract and concentrate carbon dioxide. Furthermore, because a gas that does not contain hydrogen such as natural gas contains water vapor, it is necessary to previously remove the water vapor by dehumidification before separation. Therefore, under the present situation, those membranes can be applied to only limited gases that do not contain hydrogen and water vapor.

In view of the above, a "physical absorption method" that absorbs in polyethylene glycol or the like under high pressure and a "chemical absorption method" that absorbs in an amine-based or ammonia-based solvent are adopted as a method of separating and concentrating carbon dioxide containing water vapor.

Furthermore, investigations of expanding a principle of a chemical absorption method to a membrane separation method are conducted. For example, liquid membranes in which a compound having affinity to carbon dioxide such as an organic liquid such as amine, or carbonate is covered with a polymer resin (for example, JP-A-2009-6260 and JP-T-2001-519711) are exemplified. In those liquid membranes, because a compound having high affinity involves facilitated transport of carbon dioxide, it is said that carbon dioxide selectively permeates a membrane as compared with hydrogen and helium.

In the physical absorption method and chemical absorption method described above, the cost of desorbing carbon dioxide absorbed in an affinity solvent is large, and absorption and desorption of carbon dioxide are repeated. Therefore, there is a problem that the life of the affinity solvent is short.

Furthermore, in the method using the liquid membrane described above, because the liquid membrane is constituted of a compound having an affinity to carbon dioxide and a polymer resin that does not have an affinity to carbon dioxide, a gas other than carbon dioxide such as hydrogen, permeates the polymer resin that does not have an affinity to carbon dioxide. As a result, selectivity of carbon dioxide is poor as compared to a chemical absorption method and the like.

That is, to stably separate and condensate carbon dioxide over a long period of time, it is effective that an organic liquid having an affinity to carbon dioxide is formed into a skin layer, and only carbon dioxide in a mixed gas permeates. However, there is a problem in the conventional technology that a gas to be removed such as hydrogen and helium (hereinafter referred to as a removal gas) permeates a polymer resin that fixes an organic liquid.

Furthermore, in the conventional technology, polyvinyl alcohol (PVA), an ethylene-polyvinyl alcohol copolymer (EVOH) and the like, that are easily compatible to an organic liquid and have small free volume have been used as a polymer resin.

However, only small free volume is not sufficient to suppress permeation of a removal gas such as hydrogen and, particularly, when a mixed gas supplied has high temperature, thermal motion becomes violent in an amorphous portion of a polymer and, as a result, permeability of the removal gas is increased. Furthermore, the rate of permeating a polymer resin is increased as a molecular size is decreased. For this reason, it is difficult to concentrate and recover carbon dioxide from a gas containing a molecule having small size such as hydrogen and helium, and carbon dioxide, and a new separation membrane has been desired.

Accordingly, it could be helpful to provide a carbon dioxide separation membrane that separates and concentrates carbon dioxide in high selectivity.

SUMMARY

Our carbon dioxide separation membrane include a skin layer having a function of separating carbon dioxide from a mixed gas, in which the skin layer contains from 30 to 90% by mass of a polymer resin in which a difference between an affinity to carbon dioxide and an affinity to at least one of hydrogen and helium, the affinities are expressed as free energy $\Delta G$ (kcal mol$^{-1}$), is 4.5 kcal mol$^{-1}$ or more and less than 10 kcal mol$^{-1}$, and from 10 to 70% by mass of an organic liquid having an affinity to carbon dioxide. Particularly, it is preferred to use an aromatic polyamide in which aromatic rings and amide bonds are continued as the polymer resin, and the characteristic of pressure resistance and heat resistance can be given by such a structure.

The carbon dioxide separation membrane thus provide:
 [1] an organic liquid having high affinity to carbon dioxide is contained, and
 [2] the organic liquid is fixed to the polymer resin having large difference between the affinity to carbon dioxide and the affinity to a removal gas.

Therefore, the carbon dioxide separation membrane can be stably used under high pressure, and can concentrate and recover carbon dioxide in high concentration from a mixed gas in low cost, long life and high selectivity.

BRIEF DESCRIPTION OF THE DRAWINGS

FIG. 1 is a schematic view of a gas separating apparatus used in Examples.

DESCRIPTION OF REFERENCE NUMERALS AND SIGNS

1 Gas bomb filled with 40% of carbon dioxide and 60% of helium
2 Pressure gauge
3 Back pressure valve
4 Constant temperature room
5 Water bath
6 Gas permeation cell equipped with carbon dioxide separation membrane
7 Cooling pipe
8 Gas chromatography
9 Vacuum pump
10 Cooling pipe

DETAILED DESCRIPTION

1. Carbon Dioxide Separation Membrane

The carbon dioxide separation membrane includes a polymer resin as a support, and a skin layer containing an organic liquid fixed to the polymer resin. Both the polymer resin and the organic liquid have an affinity to carbon dioxide. The carbon dioxide separation membrane can preferentially permeate carbon dioxide than a molecule having small size such as hydrogen or helium, by suppressing the permeation of a gas by pressure difference and accelerating the permeation of a gas by concentration difference.

The term "fixed to" is defined to make an organic liquid to a state that can be equivalently dealt with a polymer molding due to dynamic or thermal characteristics. Specifically, in the state that "an organic liquid is fixed," the polymer resin and the organic liquid are compatibilized with each other, and even though phase separation occurs, those are in a microphase separation state.

The organic liquid can be arbitrarily selected from compounds having high affinity to carbon dioxide.

Conventionally, a resin having a structure in which a free volume is small was selected as a polymer resin, but suppression of the permeation of a removal gas in a polymer resin was insufficient. Properties of such a polymer resin were the cause of great decrease in the selectivity of carbon dioxide in a high temperature region particularly at which an amorphous portion of a polymer vigorously involves thermal motion.

Thus, conventional processes focused on permeation of a large amount of carbon dioxide by an organic liquid, but controlling gas permeation of a polymer resin that fixes the organic liquid was not almost made. Furthermore, we found that when an affinity to carbon dioxide is merely increased, a polymer is plasticized and deteriorated during the use for a long period of time.

We found that the permeation of a removal gas can be greatly suppressed by using a polymer resin in which the difference in affinity between carbon dioxide and a removal gas falls within a given range. As the reason for this, we believe that the removal gas is suppressed from being dissolved in the polymer resin by that carbon dioxide preferentially dissolved occupies the surface of the polymer resin.

In the skin layer of the carbon dioxide separation membrane, because the organic liquid showing high affinity to carbon dioxide is fixed to the polymer resin, the skin layer stably shows high selectivity of carbon dioxide under high pressure as compared with the conventional technology in which a polymer resin showing small affinity to carbon dioxide is a support, and as a result, high concentration carbon dioxide can be recovered.

The polymer resin constituting the skin layer of the carbon dioxide separation membrane is first described.

Affinity of a permeation molecule to a polymer resin is generally expressed by dissolution free energy $\Delta G$ (kcal mol$^{-1}$) of a permeation molecule to a polymer resin. The difference between the affinity to carbon dioxide of a polymer resin constituting a skin layer of the carbon dioxide separation membrane and an affinity to at least one of hydrogen and helium is 4.5 kcal mol$^{-1}$ or more, preferably 5.0 kcal mol$^{-1}$ or more, and more preferably 5.4 kcal mol$^{-1}$ or more. Furthermore, the difference in affinity is less than 10 kcal mol$^{-1}$, preferably less than 7 kcal mol$^{-1}$, and more preferably less than 6 kcal mol$^{-1}$.

When the difference in affinity is 4.5 kcal mol$^{-1}$ or more, carbon dioxide preferentially dissolves, thereby a removal gas is difficult to permeate the polymer resin, and as a result, high selectivity of carbon dioxide can be obtained.

When carbon dioxide is continued to be adsorbed on the polymer resin, plasticization, that is, deterioration, of the polymer resin is easy to proceed. However, when the difference in affinity is less than 10 kcal mol$^{-1}$, carbon dioxide is relatively easily eliminated from a polymer chain, and as a result, progress of deterioration is suppressed.

The affinity (that is, dissolution free energy) of a permeation molecule to a polymer resin can be calculated by, for example, using interaction energy or interaction force obtained by molecular dynamics calculation. The membrane is at least that the affinity calculated by any one of the methods described below satisfies the above range.

The method described in (M. P. Allen, D. J. Tildesley, Computer simulation of liquids, 1989, Oxford University Press, ISBN 0-19-855645-4) can be utilized as the molecular dynamics calculation method.

Furthermore, the free energy can be calculated by free energy perturbation technique, thermodynamic integration method (M. P. Allen and D. J. Tildesley, Computer Simulation of Liquids, Oxford University Press, Oxford (1987)) or energy representation method (Matubayasi, Biophysics, 46, 228, (2006), N. Matubayasi and M. Nakahara, J. Chem. Phys. 113, 6070 (2000). N. Matubayasi and M. Nakahara, J. Chem. Phys. 117, 3605 (2002); 118, 2446 (2003) (Erratum). N. Matubayasi and M. Nakahara, J. Chem. Phys. 119, 9686 (2003).) using interaction energy or interaction force obtained by molecular dynamics calculation.

The term "difference between affinity to carbon dioxide and affinity to removal gas" is an absolute value obtained by subtracting dissolution free energy of removal gas to a polymer resin from dissolution free energy of carbon dioxide to a polymer resin. It is preferred that at least one of dissolution free energy of carbon dioxide to a polymer resin, dissolution free energy of hydrogen to a polymer resin and dissolution free energy of helium to a polymer resin satisfies the range described above.

To enhance an affinity to carbon dioxide, it is preferred that the polymer resin has a structure having high affinity to carbon dioxide. Examples of substituent having high affinity to carbon dioxide include an amino group and a nitro group. Examples of a structure introduced in an aromatic ring and having an affinity to carbon dioxide include a carboxylic acid group and a sulfonic acid group, and examples of a structure introduced in a straight chain and having an affinity to carbon dioxide include an ester bond and an amide bond.

On the other hand, halogen group such as fluorine, bromine or chlorine generally has low affinity to carbon dioxide. Particularly, when the halogen group is present in the vicinity of a substituent having high affinity, it shields an affinity substituent, thereby sometimes decreasing an affinity. However, —$CH_2$—$CF_3$ has the effect of increasing an affinity, and interaction greatly changes depending on a structure adjacent to the structure introduced and a free volume. Affinity of each compound can be predicted by conducting molecular dynamics chemical calculation.

In the polymer resin constituting the skin layer of the carbon dioxide separation membrane, a diffusion coefficient of a removal gas is preferably less than $2.5 \times 10^{-5}$ $cm^2$ $s^{-1}$, more preferably less than $1.8 \times 10^{-5}$ $cm^2$ $s^{-1}$, and still more preferably less than $1.3 \times 10^{-5}$ $cm^2 s^{-1}$. Smaller diffusion coefficient of a removal gas is preferred. Particularly, the skin layer having a diffusion coefficient of less than $2.5 \times 10^{-5}$ $cm^2$ $s^{-1}$ is that helium dissolved in the skin layer is difficult to permeate to a permeation side, and therefore is a membrane having excellent selectivity. To decrease diffusibility of a removal gas, introducing a halogen group such as fluorine, bromine or chlorine in a polymer resin and decreasing a free volume are exemplified. The diffusion coefficient is calculated from molecular dynamics calculation, similar to the affinity described above. Specifically, mean-square displacement is calculated using the locus of each atom obtained by molecular dynamics calculation, and the diffusion coefficient can be obtained by a slope of the mean-square displacement.

The polymer resin used in the skin layer of the carbon dioxide separation membrane can be any polymer resin so long as the affinity to a gas such as carbon dioxide, and the diffusibility thereof fall within the above ranges, and other constitution and characteristics are not particularly limited.

In particular, the polymer resin is preferably polyamide having a repeating unit represented by formula [I] and/or a repeating unit represented by formula [II].

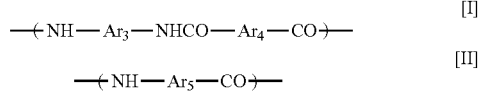

in which, $Ar_3$, $Ar_4$ and $Ar_5$ each are at least one group selected from the group consisting of groups represented by [III] and [IV]. Furthermore, X, Y and Z each are at least one group selected from the group consisting of —O—, —$CH_2$—, —CO—, —$CO_2$—, —S—, —$SO_2$— and —$C(CH_3)_2$—.

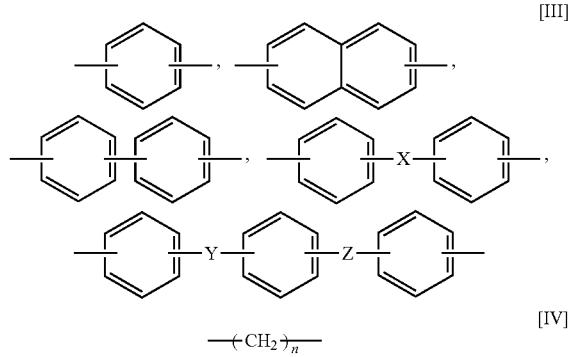

in which n is an integer of from 2 to 8.

The polyamide having such a structure has high carbon dioxide affinity.

Furthermore, the polyamide is preferably an aromatic polyamide. Specifically, of the total of the number of moles of $Ar_3$, $Ar_4$ and $Ar_5$, the proportion (mole percentage (mole fraction)) of the number of moles of the groups applicable to formula [III] is preferably 60 mol % or more, more preferably 80 mol % or more, and still more preferably 98 mol % or more.

As the aromatic ring represented by formula [III], para-coordination and meta-coordination are present, and the para-coordination occupies preferably 50 mol % or more, more preferably 80 mol % or more, and still more preferably 90 mol % or more, of the mole number of all aromatics contained in the polyamide molecule.

When the proportion selected from formula [III] is increased or the proportion of the para-coordination is increased, Young's modulus of the separation membrane comprising polyamide is increased. Therefore, it can be used without breakage even under high pressure condition, and furthermore, heat resistance is enhanced and it can be used at high temperature.

To efficiently concentrate carbon dioxide, it is important that a diffusion rate of carbon dioxide dissolved in the skin layer is increased by increasing the temperature of the polymer resin when carbon dioxide permeates the membrane. On the other hand, a permeation rate of carbon dioxide by facilitated transport is improved by the presence of water vapor. Therefore, considering selectivity, the temperature of the polymer resin when carbon dioxide permeates the membrane is preferably a range in which water vapor is present. Form the above standpoints, an operating temperature is preferably 60° C. or higher, and more preferably about 100° C.

When the temperature of the polymer resin is increased to the vicinity of a glass transition temperature, thermal motion of an amorphous structure becomes violent and a flow passage in which a removal gas permeates is formed. Furthermore, when the polymer resin is high temperature, a diffusion rate of a removal gas that permeates the flow passage is also increased. Therefore, when the polymer resin is high temperature, the removal gas permeates from the polymer resin, and therefore, carbon dioxide selectivity as the whole carbon dioxide separation membrane is greatly decreased.

Particularly, because decrease in a glass transition temperature occurs in the presence of water vapor, this phenomenon occurs at a temperature further lower than the glass transition temperature obtained by measuring with DSC or the like. For this reason, it is preferred that the temperature condition for efficiently concentrating carbon dioxide is 60° C. or higher. However, to prevent decrease in carbon dioxide selectivity, it is preferred to use a high temperature-resistant polymer in which thermal motion in an amorphous portion is small even in a high temperature condition such as an aromatic polyamide or an aromatic polyimide, as the polymer resin in this case, and considering an affinity to carbon dioxide, it is more preferred to use the aromatic polyamide. The aromatic polyamide can be generally used at a temperature up to about 120° C., and can be used at about 150° C. depending on the structure thereof.

Furthermore, the polyamide in which a part of hydrogen atoms on the aromatic ring represented by [IV] is substituted with substituents such as a halogen group such as fluorine, bromine or chlorine; an alkyl group such as methyl group, ethyl group or propyl group; an alkoxy group such as methoxy group, ethoxy group or propoxy group; a carboxylic acid group, a sulfonic acid group, a nitro group or an amino group can be used. When a halogen group such as fluorine, bromine or chloride is used, water is difficult to be adsorbed on an amide group that is a hygroscopic site, and as a result, moisture-proof property is improved. Therefore, even though used under high humidity condition, the problems such as decrease in gas barrier property, formation of flow passage of permeation of a removal gas, and swelling, by moisture absorption are difficult to occur. On the other hand, when nitro group, amino group, carboxylic acid group, sulfonic acid group and the like are used, retention of water vapor is increased, and facilitated transport of an organic liquid and carbon dioxide are increased. As a result, a permeation rate of carbon dioxide can be increased. Those two effects have the relationship of trade-off, and therefore it is possible to change the structure depending on use conditions. However, regarding the long-term use that is worthy of practical use, the problem of deterioration is fatal. Therefore, it is thought that the polymer resin is preferably that a moisture proof property is increased. Furthermore, the case of being substituted with methyl group, methoxy group, chlorine, bromine or fluorine has the effect that the flow passage of permeating a gas can be made smaller, and is therefore further preferred.

The polymer resin constituting the carbon dioxide separation membrane has the characteristic that adsorption of a removal gas is suppressed by increasing affinity to carbon dioxide to occupy the resin surface with carbon dioxide, but when the flow passage permeating a gas is too large, a gas permeates regardless of an affinity. As described above, in this case, because hydrogen and helium that have a particle size smaller than that of carbon dioxide permeate selectively, the selectivity of carbon dioxide is greatly decreased. Therefore, it is preferred to make a flow passage of a gas smaller. As described above, it is preferred that polyamide introduced in an aromatic ring having methyl group, methoxy group, chlorine, bromine or fluorine introduced therein is used as a raw material, and film formation is performed to increase molecular orientation or crystallization.

When the polymer resin is aromatic polyamide, the gas flow passage can be judged by molding the polymer resin into a film shape and measuring permeability of a single gas having small affinity to amide. Examples of the single gas having small affinity to amide include oxygen, and its permeability is preferably less than 100 ($cc/m^2/24$ hr/atm/0.1 mm), more preferably less than 10 ($cc/m^2/24$ hr/atm/0.1 mm), and still more preferably 1 ($cc/m^2/24$ hr/atm/0.1 mm). Permeation of a removal gas can be suppressed as the permeability of oxygen gas is decreased, and this is preferred. In the case of 100 ($cc/m^2/24$ hr/atm/0.1 mm) or more, a gas permeates without being almost influenced by molecular orientation, crystallization and affinity, and it is difficult to selectively permeate carbon dioxide.

The permeability of a gas to a membrane can be calculated from a volume V (cc) of a gas passed during a time T (hr) when a gas has permeated a membrane having an area R ($m^2$) and a thickness of Th (mm) under a pressure P (atm).

Other than the above, the flow passage can be presumed by a size of a free volume, and a diameter of a free volume measured by a positron annihilation technique is preferably 0.2 nm or more and less than 0.8 nm, more preferably 0.25 nm or more and less than 0.6 nm, and still more preferably 0.3 nm or more and less than 0.5 nm. To achieve this range, molecular orientation and crystallization of a resin having a specific molecular structure (polyamide, an ethylene-polyvinyl alcohol copolymer, and the like) are controlled. Molecular orientation is performed by preferably stretching, and more preferably stretching in biaxial directions. A method of stretching in vertical and horizontal biaxial directions may be either of successive biaxial direction stretching and simultaneous biaxial stretching. The crystallization can be conducted by a heat treatment. However, there is a possibility that an organic liquid contained is deteriorated at a crystallization temperature of a polymer resin. Therefore, it is necessary, for example, to use an organic liquid having high boiling point or to conduct crystallization at relatively low temperature over a long period of time.

The organic liquid constituting the skin layer of the carbon dioxide separation membrane is described below.

The organic liquid constituting the skin layer of the carbon dioxide separation membrane is preferable as an affinity to carbon dioxide in an ionic state is high. When a mixed gas containing water vapor and carbon dioxide is supplied to the carbon dioxide separation membrane, facilitated transport of carbon dioxide is conducted. Therefore, a permeation rate of carbon dioxide is faster than that of a removal gas such as hydrogen and helium, having small molecular size. When water vapor is not contained in a mixed gas, facilitated transport is conducted, but when water vapor is contained, an organic liquid is ionized, and high affinity to carbon dioxide can be utilized. Therefore, it is preferred that water vapor is contained. As a structure having high affinity in an ionic state, amino group is preferred, and preferred one including the conventional amine compound can be used.

The content of the organic liquid in the skin layer of the carbon dioxide separation membrane is from 10 to 70% by mass, preferably from 30 to 60% by mass, and more preferably from 40 to 55% by mass. When the content is 10% by mass or more, selectivity sufficient to concentrate carbon dioxide can be obtained, and when the content is 70% by mass or less, the amount of the polymer resin can be 30% by mass or more. As a result, sufficient fixing effect can be obtained and precipitation of the organic liquid is suppressed.

The structure of the organic liquid constituting the skin layer of the carbon dioxide separation membrane is not particularly limited so long as it is a compound having an affinity to carbon dioxide. Preferred example thereof is an amine compound, and examples of the amine compound include compounds having primary or secondary amino group, for example, monoamine such as monoethanolamine, diethanolamine, piperidine or 2,3-diaminopropionic acid; diamine such as ethylene diamine, 1,4-butanediamine, 1,5-diaminopentane, 1,6-hexane-diamine or 1,3-diamino-2-propanol; polyamine such as polyallylamine, polyvinylamine or polyethyleneimine; and derivatives synthesized using those as raw materials. Compounds having primary amine can give high selectivity, and are therefore more preferred. At least one kind can be preferably selected from those compounds depending on the conditions of the mixed gas.

Examples of the particularly preferred amine compound include diamines, and compounds having a melamine skeleton that connects to the diamines. When the melamine skeleton is present, durability in the case of using at high temperature is increased.

Synthesis method includes a method of methylolating a terminal of melamine with formaldehyde and then condensing with diamines. Specifically, melamine and formaldehyde are stirred at from 70 to 90° C. and a pH of from 8.5 to 11.0 for from 0.5 to 2 hours to perform methylolation. Diamine is then added, followed by stirring at from 80 to 90° C. and a pH of from 6.0 to 7.5 for from 1 to 2 hours, thereby condensing a methylol group and amine. Examples of the diamine preferably used as a raw material include ethylenediamine, 1,4-butanediamine, 1,5-diaminopentane and 1,6-hexanediamine, and ethylenediamine can give high selectivity and therefore is preferred.

The molecular weight of the organic liquid is preferably less than 800 from the stand-point of compatibility with the polymer resin. When using an organic liquid having a molecular weight of 800 or more, the organic liquid is preferably used by mixing with an organic liquid having a molecular weight of less than 800, and the amount of the organic liquid having a molecular weight of 800 or more is preferably 20% by mass or less based on the whole organic liquid.

Regarding the carbon dioxide separation membrane, a constitution in which an organic liquid is fixed to a polymer resin is described below.

The skin layer in which the organic liquid is fixed to the polymer resin is formed on the surface of the carbon dioxide separation membrane. The skin layer is a layer having a function of separating carbon dioxide and a removal gas. When the skin layer has a porous structure physically formed, the porous structure becomes a defect and sometimes forms a flow passage through which a removal gas passes, and this is not preferred. The porous structure physically formed used herein is that a pore diameter is 10 nm or more, and is formed by causes such as phase separation such as non-solvent induced phase separation or thermally induced phase separation, particles or gas bubbles. To form a skin layer having no physically-formed porous, it is preferred that the amount of a solvent is decreased when forming a membrane, and its method is described hereinafter.

The carbon dioxide separation membrane may be an asymmetric membrane in which the skin layer is laminated on a porous layer and may be a symmetric membrane in which the whole layer is a skin layer. That is, the carbon dioxide separation membrane is sufficient if it is provided with at least a skin layer, and may be further provided with other layer.

The asymmetric membrane has the merit that pressure resistance is improved by that the porous layer plays a role of a support and, on the other hand, the symmetric membrane has the merit that the thickness of the skin layer is comparatively easily controlled.

The thickness of the skin layer is not particularly limited, and is preferably from 3 μm to 500 μm, more preferably 12 μm or more and less than 300 μm, and still more preferably 20 μm or more and less than 250 μm. To preferentially permeate carbon dioxide by utilizing an affinity while suppressing a permeation amount of a removal gas low, the thickness is preferably 3 μm or more. A membrane having a thickness of a skin layer of 500 μm or less can permeate carbon dioxide in an appropriate rate.

In the carbon dioxide separation membrane, the skin layer having a separation function is that the total of the content of the polymer resin and the content of the organic liquid is preferably 90% by mass or more, more preferably 95% by mass or more, and still more preferably 99% by mass or more. When the content of the polymer resin and organic liquid is 90% by mass or more, excellent carbon dioxide selectivity is achieved. Examples of compounds contained in the skin layer, other than the polymer resin and the organic liquid, include residues of additives when producing such as a catalyst or a neutralizer; inorganic salts such as cesium carbonate, calcium carbonate or cesium hydroxide; and various additives such as a crosslinking agent having an isocyanate group, an acrylate group, a vinyl group or a methylol group, an antioxidant, a flame retardant or a lubricant.

2. Production Method

A method of obtaining the carbon dioxide separation membrane is described below by reference to an example using aromatic polyamide as the polymer resin and using an amine compound as the organic liquid, but the method of producing the carbon dioxide separation membrane is not limited to the method described below.

Film-forming Raw Liquid Preparation Method

A production method of a membrane includes a step of preparing a film-forming raw liquid. Use of aromatic polyamide as the polymer resin is described below.

When obtaining aromatic polyamide from acid chloride and diamine, it is synthesized by solution polymerization in an aprotic organic polar solvent such as N-methylpyrrolidone (NMP), dimethylacetamide (DMAc) or dimethylformamide (DMF) or interfacial polymerization using an aqueous medium. A polymer solution obtained produces hydrogen chloride as a by-product when acid chloride and diamine are used as monomers. When neutralizing this, an inorganic neutralizer such as calcium hydroxide, calcium carbonate or lithium carbonate, and an organic neutralizer such as ethylene oxide, propylene oxide, ammonia, triethylamine, triethanolamine or diethanoamine are used.

Those polymer solutions may be directly used as the film-forming raw liquid. Alternatively, a film-forming raw liquid may be prepared by once isolating a polymer and redissolving in the organic solvent described above or an inorganic solvent such as sulfuric acid.

A film-forming raw liquid can be obtained by mixing a suitable amine compound with the polymer solution. It is preferred that the film-forming raw liquid contains an organic solvent in a range of from 60 to 98 wt % from the standpoints of the polymer resin, compatibility between the organic liquid and the organic solvent, and film formability.

Film Formation Step

A separation membrane can be obtained from the polymer solution prepared above by a so-called "solution film-formation" method. Film-forming in a flat membrane shape is described below, but the polymer solution may be film-formed in other shape such as a hollow fiber membrane shape.

A symmetric membrane of a flat membrane can be formed by casting the raw liquid on a stainless steel plate or the like to form a thin film and then scattering a solvent from the thin film layer by drying. Furthermore, the asymmetric membrane can be formed by dipping the raw liquid in a coagulating bath. In dipping the raw liquid in a coagulating bath, the thickness of the skin layer having a separation function tends to be decreased. Therefore, to control the thickness of the skin layer, only a solvent on the surface is removed by drying to increase polymer concentration, or phase separation rate in a coagulating bath is decreased. To decrease the phase separation rate in a coagulating bath, a temperature of the coagulating bath is adjusted or a small amount of an alcohol is added to the coagulating bath. Stretching may be conducted in the coagulating bath.

Cleaning Step

After formation of the skin layer having a separation function, the membrane is separated from the stainless steel plate and introduced in a subsequent cleaning bath, and desalination and solvent removal are then carried out. The cleaning bath preferably uses a solvent that is a poor solvent to the polymer resin and organic liquid and is a good solvent to the organic solvent, but can use cold water or the like. An inorganic salt may be contained in the cleaning bath. The cleaning step is not essential.

Stretching Step

The membrane undergone the cleaning step is dried and then heat-treated to form the carbon dioxide separation membrane. Stretching may be conducted simultaneously with or before the heat treatment (during a film formation step, or after the film formation step and before the heat treatment). In conducting stretching, the stretching may be conducted in a uniaxial direction or vertical and horizontal biaxial directions, but considering rigidity, the vertical and horizontal biaxial stretching is preferred. The method of stretching in the vertical and horizontal biaxial directions may be either of successive biaxial stretching or simultaneous biaxial stretching. The stretching temperature is preferably from 200 to 400° C. for molecular orientation, more preferably from 220 to 350° C., and still more preferably from 240 to 300° C. The stretching ratio is preferably 1.1 times or more, more preferably in a range of from 1.1 to 3 times, and still more preferably in a range of from 1.3 to 2 times, in both vertical and horizontal directions.

When the stretching is conducted in this range, the polymer resin is molecular-oriented. As a result, a free volume is decreased, and permeation of a removal gas from the polymer resin can be suppressed. Furthermore, when shrinking is conducted after stretching, elongation is recovered, thereby cutting resistance is improved.

Heat Treatment Step

In conducting a heat treatment, the heat treatment is preferably conducted at a boiling point or lower of the organic solvent to prevent volatilization of the organic liquid, but the volatilization may be suppressed by adding particles. The heat treatment temperature is preferably 160° C. or higher, and more preferably 220° C. or higher. Furthermore, the heat treatment temperature is preferably 450° C. or lower. When those treatments are performed, molecular orientation and crystallization of the polymer resin occur. As a result, a free volume is decreased and permeation of a removal gas from the polymer resin can be suppressed. Particularly, when the heat temperature is 160° C. or higher, sufficient effect is obtained. Furthermore, when the heat treatment temperature is 450° C. or lower, dimensional change by heat can be minimized, and additionally coarsening of a phase separation structure can be suppressed and good toughness is obtained.

The content of the polymer resin constituting the skin layer of the carbon dioxide separation membrane is preferably from 30 to 90% by mass, more preferably from 40 to 60% by mass, and still more preferably 45 to 55% by mass. When the content of the polymer resin is less than 30% by mass, the shape of the skin layer cannot be maintained when applying a pressure difference of 1 atm or more, and the organic liquid separates out, and when the content exceeds 90% by mass, a membrane having poor carbon dioxide selectivity is obtained.

The carbon dioxide separation membrane thus obtained can selectively permeate carbon dioxide from a mixed gas, as described below.

3. Method of Concentrating Carbon Dioxide

In a method of concentrating carbon dioxide using the carbon dioxide separation membrane, the temperature of the mixed gas (that is, a gas supplied to the carbon dioxide separation membrane) is not particularly limited. However, the temperature of the mixed gas is preferably 60° C. or higher, more preferably 80° C. or more and lower than 160° C., and still more preferably 90° C. or more and lower than 120° C.

Diffusing rate of carbon dioxide in the carbon dioxide separation membrane is increased as the temperature of the mixed gas is increased. Therefore, a membrane permeation rate of carbon dioxide is increased, and carbon dioxide selectivity is improved. On the other hand, when the temperature of the supply gas is too high, there is a concern that the separation membrane thermally deforms or a polymer carbonizes. Therefore, although depending on a molecular structure of the carbon dioxide separation membrane used, the supply temperature of the mixed gas is preferably lower than 160° C., furthermore lower than 120° C. Particularly, the effect of facilitated transport is increased in the presence of water vapor. Therefore, the supply temperature is particularly preferably about 100° C. When the supply temperature exceeds 120° C., selectivity of carbon dioxide is decreased.

Furthermore, the temperature of a supply gas that can be separated by an amine absorption method is from about 30 to 50° C. Therefore, a method of using the carbon dioxide separation membrane is particularly useful in a range of 60° C. or higher. Moreover, PVA and EVOH used in a general liquid membrane thermally deforms at about 60° C. when used for a long period of time under high humidity condition though it depends on a crystallinity thereof. Therefore, as a membrane used in a range of 60° C. or higher, the carbon dioxide separation membrane in which aromatic polyamide is used as the polymer resin is particularly useful as compared with the conventional liquid membrane.

The supply gas that can selectively permeate the carbon dioxide separation membrane is not particularly limited so long as it is a mixed gas containing carbon dioxide. However, examples thereof include mixed gases containing hydrogen, helium, nitrogen, methane, water vapor and the like as the removal gas. Particularly, it is useful when 1 mol % or more of hydrogen is contained in a supply gas, preferably when from 30 mol % or more and less than 90 mol % of hydrogen is contained, and more preferably when 50 mol % or more and less than 80 mol % of hydrogen is contained. Affinity greatly contributes to the permeation rate by the carbon dioxide separation membrane, and even though hydrogen or helium is mixed in the supply gas, the permeation rate of carbon dioxide among components contained in the supply gas is most great. Therefore, it is particularly useful as a method of concentrating carbon dioxide when the content of hydrogen in the supply gas falls within the above range.

The method of concentrating carbon dioxide using the carbon dioxide separation membrane is that carbon dioxide is concentrated from the supply gas in a selectivity of preferably 25 or more, more preferably 30 or more, and still more preferably 35 or more. The higher the selectivity of carbon dioxide, it is preferable. When the selectivity is less than 25, high concentration carbon dioxide cannot be obtained, and such a case does not say to be an effective concentration method.

The carbon dioxide separation membrane is useful to selectively separate, concentrate and recover an acidic gas. Specifically, the membrane is particularly useful to separate and concentrate carbon dioxide ($CO_2$).

EXAMPLES

Measurement Method of Characteristics and Evaluation Method of Effect

The measurement method of characteristic values and the evaluation method of effect are as follows.

(1) Affinity between a Polymer Resin and Carbon Dioxide/Helium (Dissolution Free Energy) and Diffusibility were Calculated by Molecular Dynamics Calculation.

The molecular dynamics calculation was conducted using FORTRAN program independently developed by Toray Industries, Inc. An electronic computer mounting Xeon (registered trademark) X5472 of a clock frequency 3.0 GHz was used for the calculation.

Calculation model of the polymer resin and the polymer resin/permeation molecule mixed system used in the molecular dynamics calculation was prepared by the following method. Primary structure of the polymer resin and permeation molecule were prepared using 3D-Sketcher on a molecular design system Cerius$^2$ (registered trademark) manufactured by Accelrys. In this case, a molecular weight of the polymer resin was controlled to be from 2,900 to 3,000 g/mol. Regarding hydrogen bonded to carbon, united atom model in which those are not treated as dew was applied.

Next, a model system in which four polymer resin molecules and the permeation molecule were randomly arranged under three-dimensional periodic boundary condition was constituted using Amorphous Builder. To perform structural relaxation to the model system, molecular dynamics calculation of 4,000 ps in total shown below was carried out, and stress of the system was removed. The molecular dynamics calculation includes calculation of 10 ps (picosecond) using NVT ensemble (M. Tuckerman, B. J. Berne and G. J. Martyna, J. Chem. Phys. 97, 1990) of 25° C., calculation of 190 ps using NVT ensemble of 300° C., calculation of 100 ps using NVT ensemble of 25° C., calculation of 50 ps using NPT ensemble/cubic cell (H. C. Anderson, J. Chem. Phys. 72, 2384 (1980)) of 1 atm/25° C., calculation of 150 ps using NPT ensemble/rhombic cell (M. Parrinello and A. Rahman, J. Appl. Phys. 52, 7182 (1981)) of 1 atm/25° C., calculation in which a temperature is repeatedly increased and decreased five times in a range of from 25 to 200° C. in a 400 ps period (NPT ensemble/rhombic cell of 1 atm/25 to 200° C.), and calculation of 1,500 ps using NPT ensemble/rhombic cell of 1 atm/25° C. The structure finally obtained was considered as an initial structure of molecular dynamics calculation for obtaining affinity and diffusibility.

To calculate a diffusion coefficient, molecular dynamics calculation of 5,000 ps was carried out using NPT ensemble/rhombic cell of 1 atm/25° C. for a polymer resin/carbon dioxide (four molecules)/helium (four molecules) mixed system. Mean-square displacement was calculated using the locus of each atom obtained, and the diffusion coefficient was calculated from a slope of from 10 to 100 ps of the mean-square displacement.

To calculate an affinity (dissolution free energy), molecular dynamics calculation of 9,000 ps of a polymer resin/carbon dioxide (one molecule) mixed system, molecular dynamics calculation of 5,000 ps of a polymer resin/helium (one molecule) mixed system, and molecular dynamics calculation of 3,000 ps of a polymer resin single system were carried out using NPT ensemble/rhombic cell of 1 atm/25° C. Energy distribution function was calculated from intramolecular interaction energy obtained by the molecular dynamics calculations, and using the energy distribution function, free energy was calculated by an energy indication method.

The molecular dynamics calculation in the examples was carried out according to the method described in JP-A-2011-123874, that is, by the steps 1 to 7 described hereinafter. This method is that steps 3 to 5 for controlling a scale value of intermolecular force were added to steps 1, 2, 6 and 7 of the general molecular dynamics calculation. Furthermore, $\lambda_{ij}$ and $\delta$ in the fifth and sixth expressions in the right side of a numerical formula (1) are a scale value and a parameter adjusting distance dependence of energy and force, respectively, and in the general molecular dynamics calculation, $\lambda_{ij}=1$. By controlling $\lambda_{ij}$, efficiency of the calculation of intermolecular interaction energy can be improved. For structure relaxation and diffusibility calculation, general molecular dynamics calculation by steps 1, 2, 6 and 7 were carried out as $\lambda_{ij}=1$ (constant). Furthermore, for affinity (dissolution free energy) calculation, molecular dynamics calculation including a step of controlling a scale value $\lambda_{ij}$ of intermolecular force by steps 1 to 7 was carried out.

It includes at least:
(1) a step of inputting coordinate of an atom, bonding information, potential parameter type, charge, mass, increase and decrease conditions of a scale value, output conditions and initial value of a scale value to an electronic computer, and storing in a memory (step 1);

(2) a step of calculating intramolecular interaction energy, intermolecular interaction energy, intramolecular force and intermolecular force using the coordinate of an atom, bonding information, potential parameter type, charge, a scale value, and potential function shown by the numerical formula (1), that were stored in a memory, followed by storing in a memory (step 2):

Numerical formula (1)
$$V = \sum_{l=1}^{N_{bond}} \frac{1}{2} K_l^{bond}(R_l - R_l^0)^2 +$$
$$\sum_{l=1}^{N_{angle}} \frac{1}{2} K_l^{angle}(\theta_l - \theta_l^0)^2 +$$
$$\sum_{k=1}^{M_{torsion}} \sum_{l=1}^{N_{torsion}} \frac{1}{2} K_{k,l}^{torsion}\{1 - \cos(n_{k,l}\phi_l - \phi_{k,l}^0)\} +$$
$$\sum_{l=1}^{N_{inversion}} \frac{1}{2} K_l^{inversion}(1 - \cos|\omega_l - \omega_l^0|) +$$
$$\sum_{i=1}^{N_{atom}-1} \sum_{j>i}^{N_{atom}} \lambda_{ij} D_0 \left\{ \left( \frac{(r_{ij}^0)^2}{r_{ij}^2 + (1-\lambda_{ij})\delta} \right)^6 - 2\left( \frac{(r_{ij}^0)^2}{r_{ij}^2 + (1-\lambda_{ij})\delta} \right)^3 \right\} +$$
$$\sum_{i=1}^{N_{atom}-1} \sum_{j>i}^{N_{atom}} \lambda_{ij} \frac{q_i q_j}{r_{ij}}$$

in which $\lambda_{ij}$ and $\delta$ are a scale value and a parameter adjusting distance dependence of energy and force, respectively, and subscripts i and j indicate atomic number; $\delta \geq 0$ m², and an initial value of $\lambda_{ij}$ is 1;

(3) a step of switching increase and decrease of a scale value and the presence or absence of output, based on increase and decrease conditions of a scale value, output conditions and repeating number that were stored in a memory (step 3);

(4) a step of decreasing the scale value $\lambda_{ij}$ to a value of less than 1 and storing in a memory when i and j are a combination of an atom in a high molecule and an atom in a low molecule (step 4);

(5) a step of increasing the scale value $\lambda_{ij}$ to 1 and storing in a memory when i and j are a combination of an atom in a high molecule and an atom in a low molecule (step 5);

(6) a step of outputting the coordinate of an atom and the intermolecular interaction energy that were stored in a memory (step 6); and (7) a step of renewing the coordinate and a speed of an atom using the mass of an atom, intramolecular force and intermolecular force and then storing in a memory (step 7).

Steps 2 to 7 are repeatedly conducted until reaching a specified number of times.

The first expression in the right side of the numerical formula (1) shows a potential function of a bond length, the second expression shows a potential function of a bond angle, the third expression shows a potential function of a dihedral angle, the fourth expression shows a potential function of a reversal, the fifth expression shows a potential function of van der Waals (vdW) force, and the sixth expression shows a potential function of Coulomb's force. The first to fourth expressions in the numerical formula (1) are collectively called an intramolecular potential function, and the fifth and sixth expressions are collectively called an intermolecular potential function. Furthermore, the corresponding energies are called intramolecular interaction energy and intermolecular interaction energy, respectively, and forces calculated using a formula obtained by differentiating the intramolecular potential function and intermolecular potential function by a position of an atom are called intramolecular force and intermolecular force, respectively.

In the step 2, the intramolecular interaction energy and intermolecular interaction energy were calculated, and intramolecular force and intermolecular force were calculated using a formula in which the numerical formula (1) was differentiated by the position of an atom. Furthermore, intramolecular pressure and intermolecular pressure were calculated from those intramolecular force, intermolecular force and the position of an atom. The calculated intramolecular interaction energy, intermolecular interaction energy, intramolecular force, intermolecular force, intramolecular pressure and intermolecular pressure were stored in a memory. Calculation of vdW potential and Coulomb's potential of real space was calculated as cut-off radius $r_c$=10 angstroms, Coulomb's potential of reciprocal space was $\alpha$=0.21 angstrom$^{-1}$ and $|n|^2_{max}$=50 using Ewald method (Solid St. Phys. Advances in Research and Applications, edited by M. P. Tosi, F. Seitz and D. Turnbull (Academic, New York, 1964), Vol. 16, pp. 1-120).

Setting of the potential parameter used in the step 2 is as follows. Parameter and charge described in the literature (T. Somasundaram, M. in het Panhuis, R. M. Lynden-Bell, and C. H. Patterson, J. Chem. Phys. 111, 2190 (1999).) were used as potential parameter and charge of carbon dioxide. Regarding helium, parameter described in the literature (J. L. Durant and F. Kaufman, Chem. Phys. Lett. 142, 246 (1987).) was used as the potential parameter, and the charge was 0 (zero).

Dihedral angle potential parameter and charge of a polymer resin are determined by quantum chemical calculation, and regarding parameters other than them, AMBER (W. D. Cornell, P. Cieplak, C. I. Bayly, I. R. Gould, K. M. Merz Jr, D. M. Ferguson, D. C. Spellmeyer, T. Fox, J. W. Caldwell, and P. A. Kollman, J. Am. Chem. Soc., 117, 5179 (1995)), DREIDING (S. L. Mayo, B. D. Olafson, and W. A. Goddard III, J. Phys. Chem., 94, 8897 (1990), and potential parameters by Kuwajima et al. (M. Fukuda and S. Kuwajima, J. Chem. Phys., 107, 2149 (1997), M. Fukuda and S. Kuwajima, J. Chem. Phys., 108, 3001 (1998), S. Kuwajima, H. Noma, and T. Akasaka, Proc. 4th Symposium on Computational Chemistry, pp. 53, Japan Chemistry Program Exchange, Japan (1994), S. Kuwajima, T. Akasaka, and H. Noma, Proc. 5th Symposium on Computational Chemistry, pp. 108, Japan Chemistry Program Exchange, Japan (1995)) were used. Calculation conditions of the quantum chemistry calculation are as follows. Quantum chemical calculation of B3LYP/6-31G (d, p) level (A. D. Becke, J. Chem. Phys., 98, 5648 (1993), C. Lee, W. Yang, and R. G. Parr, Phys. Rev. B, 37, 785 (1998)) was performed to optimize a structure, followed by electrostatic potential (ESP) fitting was conducted by CHelpG method (C. M. Breneman and K. B. Wiberg, J. Comp. Chem., 11, 361 (1990)). Thus, a value of charge was obtained. Dihedral angle parameter was obtained from the quantum chemistry calculation of HF/6-31G (d, p) level. The quantum chemistry calculation was conducted using a general-purpose program Gaussian (registered trademark) 98 (Gaussian 98, Revision A. 11. 3, M. J. Frisch et al., Gaussian, Inc., Pittsburgh Pa. (2002)).

In calculating an affinity (dissolution free energy), the parameter 6 in the numerical formula (1) was set to 1.0 [angstrom$^2$], and the minimum value of $\lambda$ was set to $10^{-5}$ for carbon dioxide and 0 for helium.

In calculating the affinity between a polymer resin and carbon dioxide, the conditions in increase and decrease of a scale value $\lambda$ are as follows. $\lambda$ was decreased from 1 to the minimum value in 20 ps at a constant speed (step 4), $\lambda$ was maintained at the minimum value for 60 ps, $\lambda$ was increased from the minimum value to 1 in 20 ps at a constant speed (step 5), $\lambda$ was maintained at 1 for 80 ps, and the intermolecular interaction energy was output in the state that $\lambda$ was maintained at 1 for 20 ps (step 6).

In calculating the affinity between a polymer resin and helium, the conditions in increase and decrease of a scale value $\lambda$ are as follows. $\lambda$ was decreased from 1 to the minimum value in 5 ps at a constant speed (step 4), $\lambda$ was maintained at the minimum value for 15 ps, $\lambda$ was increased from the minimum value to 1 in 5 ps at a constant speed (step 5), $\lambda$ was maintained at 1 for 20 ps, and the intermolecular interaction energy was output in the state that $\lambda$ was maintained at 1 for 5 ps (step 6).

In step 7, the coordinate and speed of an atom after micro time were calculated by numerical integration using the mass of an atom, intramolecular force, intermolecular force, intramolecular pressure and intermolecular pressure that were stored in a memory, followed by storing in a memory. RESPA method (S. J. Stuart, R. Zhou, and B. J. Berne, J. Chem. Phys. 105, 1426 (1996), G. J. Martyna, Mol. Phys. 87, 1117 (1996)) was used in the numerical integration. Regarding calculation model containing hydrogen and helium, the minimum time increment was 0.125 fs (femtosecond), and regarding calculation model that do not contain those, the minimum time increment was 0.25 fs. Repeat count of steps 2 to 7 is a number obtained by dividing calculation time of molecular dynamics by the minimum time increment.

(2) Separation Test between Carbon Dioxide and Helium

Selectivity of carbon dioxide was measured using an apparatus shown by a schematic view of FIG. 1.

A gas in which 40 mol % of a carbon dioxide gas and 60 mol % of a helium gas had been mixed was supplied from a gab bomb (Sumitomo Seika Chemicals Co., Ltd.). Next, a pressure was adjusted by a back pressure valve 3 such that a pressure gauge 2 connected to a piping at a supply side shows 3 atm. The mixed gas having a pressure thus adjusted was supplied to a constant temperature chamber 4 maintained at a treatment temperature, passed through a water bath 5 to humidify, and supplied to a gas permeation cell 6 equipped with a separation membrane. Thereafter, the mixed gas was passed through a cooling pipe 7 to remove water vapor, and discharged to a gas chromatography 8. On the other hand, in a permeation side, components of a supplied gas permeating a membrane was swept by a vacuum pump 9, passed through a cooling pipe 10 to remove water vapor, and discharged to the gas chromatography 8.

A volume of carbon dioxide measured by a gas chromatography was divided by a volume of helium to calculate volume ratios of a supply side and a permeation side, respectively, and the volume ratio of the permeation side was divided by the volume ratio of the supply side to calculate carbon dioxide selectivity.

(3) Membrane Thickness

Thickness of a membrane was obtained by the following method using Digital Micrometer K402B manufactured by Anritsu Corporation.

A circular membrane sample having a diameter of 5 cm was obtained as a sample, and a thickness at the center thereof was measured (point 1). Next, a measurement point was moved 1 cm in an arbitrary direction from the position of the point 1 and a thickness at the position was measured (point 2). Subsequently, a measurement point was moved 2 cm from the position in a direction of the point 1 and a thickness at the position was measured (point 3). The measurement point was moved to the position of the point 1 and thicknesses of positions at which the measurement position was moved 1 cm in directions of 90° and 270° to a line obtained by connecting the point 2, the point 1 and the point 3 were measured, respectively (point 4 and point 5). The total value at the above five points was divided by 5 to obtain a thickness of a membrane.

Polymerization Example 1

2-Chloroparaphenylene diamine corresponding to 70 mol % and 4,4'-diaminodiphenyl ether corresponding to 30 mol % were dissolved in dehydrated N-methyl-2-pyrrolidone, then 2-chloroterephthalic acid chloride corresponding to 100 mol % was added, and polymerization was conducted by stirring for 2 hours. Thereafter, neutralization was conducted with lithium carbonate to obtain an aromatic polyamide solution having a polymer concentration of 20 mass %.

Polymerization Example 2

4,4'-Diaminodiphenyl ether corresponding to 100 mol % was dissolved in dehydrated N-methyl-2-pyrrolidone, then terephthalic acid chloride corresponding to 30 mol % and isophthalic acid chloride corresponding to 70 mol % were added, and polymerization was conducted by stirring for 2 hours. Thereafter, neutralization was conducted with lithium carbonate to obtain an aromatic polyamide solution having a polymer concentration of 20% by mass.

Polymerization Example 3

Metaphenylene diamine corresponding to 70 mol % and 4,4'-diaminodiphenyl ether corresponding to 30 mol % were dissolved in dehydrated N-methyl-2-pyrrolidone, then terephthalic acid chloride corresponding to 30 mol % and isophthalic acid chloride corresponding to 70 mol % were added, and polymerization was conducted by stirring for 2 hours. Thereafter, neutralization was conducted with lithium carbonate to obtain an aromatic polyamide solution having a polymer concentration of 20% by mass.

Polymerization Example 4

Metaphenylene diamine corresponding to 100 mol % was dissolved in dehydrated N-methyl-2-pyrrolidone, then isophthaloyl chloride corresponding to 100 mol % was added, and polymerization was conducted by stirring for 2 hours. Thereafter, neutralization was conducted with lithium carbonate to obtain an aromatic polyamide solution having a polymer concentration of 20% by mass.

Polymerization Example 5

4,4'-Diaminodiphenyl ether corresponding to 50 mol %, paraphenylene diamine corresponding to 25 mol % and orthodianisidine corresponding to 25 mol % were dissolved in dehydrated N-methyl-2-pyrrolidone, then isophthalic acid chloride corresponding to 100 mol % was added, and polymerization was conducted by stirring for 2 hours. Thereafter, neutralization was conducted with lithium carbonate to obtain an aromatic polyamide solution having a polymer concentration of 20% by mass.

Synthesis Example 1

40 g of melamine (manufactured by Tokyo Chemical Industry Co., Ltd.) was added to 58 g of formaldehyde (manufactured by Tokyo Chemical Industry Co., Ltd.), and a pH was adjusted to 9.5 with sodium hydroxide, followed by stirring at 80° C. for 60 minutes. Next, 29 g of ethylenediamine (manufactured by Tokyo Chemical Industry Co., Ltd.) was added, and subsequently acetic acid was added such that a pH of the solution becomes 6.5, followed by stirring at 90° C. for 60 minutes. Unnecessary components were removed from the resulting mixture by Kugelrohr to obtain a melamine derivative having primary amine bonded thereto.

Examples 1 to 3

Alanylglycine was added to the aromatic polyamide solution obtained in Polymerization Example 1 such that a mass ratio to the aromatic polyamide is 1:1, followed by stirring to compatibilize those. Thus, a film-forming raw liquid was obtained. The film-forming raw liquid was cast on a stainless steel plate by an applicator with a coating thickness of 1 mm, and dried until a gel film has a self-supporting property at a hot air temperature of 80° C., and then the gel film obtained was peeled from the stainless steel plate. The gel film was fixed to a metal frame, and dipped in a water bath of 20° C., thereby extracting a residual solvent and the like in water. After water extraction, water on both surfaces of the aqueous gel film was wiped with gauze, followed by heat-treating in an oven of 180° C. in the state of being fixed to the metal frame. Thus, a carbon dioxide separation membrane was obtained. The results obtained by evaluating the obtained separation membranes at treatment temperatures of 60° C., 80° C. and 120° C. are shown in Table 1 respectively.

Example 4

N-(4-aminobenzoyl)glycine and cesium carbonate were added to the aromatic polyamide solution obtained in Polymerization Example 2 such that a mass ratio to the aromatic polyamide is 5:4:1, followed by stirring to compatibilize those. Thus, a film-forming raw liquid was obtained. The film-forming raw liquid was cast on a stainless steel plate by an applicator with a coating thickness of 1 mm, and dried until a gel film has a self-supporting property at a hot air temperature of 80° C., and then the gel film obtained was peeled from the stainless steel plate. The gel film was stretched to 1.1 times×1.3 times at 250° C. using a stretcher, and a direction stretched to 1.3 times was contracted up to 1.2 times. Thus, a separation membrane was obtained. The results obtained by evaluating the obtained separation membrane at a treatment temperature of 60° C. are shown in Table 1.

Example 5

2,3-Diaminopropionic acid and polyallylamine were added to the aromatic polyamide solution obtained in Polymerization Example 3 such that a mass ratio to the aromatic polyamide is 5:4:1, followed by stirring to compatibilize those. Thus, a film-forming raw liquid was obtained. Film formation was conducted in the same manner as in Example 1, except that the heat treatment temperature was 150° C.

Thus, a separation membrane was obtained. The results obtained by evaluating the obtained separation membrane at a treatment temperature of 60° C. are shown in Table 1.

Example 6

Polyamide amine (manufactured by Ardrich) and polyethylene imine were added to the aromatic polyamide solution obtained in Polymerization Example 4 such that a mass ratio to the aromatic polyamide is 5:4:1, followed by stirring to compatibilize those. Thus, a film-forming raw liquid was obtained. The polymer solution was cast on a stainless steel plate by an applicator with a coating thickness of 1 mm, followed by dipping in an ethanol bath to conduct gelation. The gel film was peeled from the stainless steel plate in the ethanol bath, the gel film was placed on a polysulfone flat membrane, and taken out of the ethanol bath. The gel film was fixed to a metal frame, and dipped in a water bath, thereby extracting a residual solvent and the like in water. After water extraction, water on both surfaces of the aqueous gel film was wiped with gauze, followed by heat-treating in an oven of 180° C. in the state of being fixed to the metal frame. Thus, a separation membrane was obtained. The results obtained by evaluating the obtained separation membrane at treatment temperature of 60° C. are shown in Table 1.

Example 7

The melamine derivative obtained in Synthesis Example 1 was added to the aromatic polyamide solution obtained in Polymerization Example 5 such that a mass ratio of the aromatic polyamide and the melamine derivative is 6:4. The mixture thus obtained was stirred to compatibilize the aromatic polyamide and the melamine derivative. Thus, a film-forming raw liquid was obtained.

The film-forming raw liquid was cast on a stainless steel plate by an applicator with a coating thickness of 250 μm, and dried at a hot air temperature of 120° C. to obtain a gel film. The gel film was dried until having a self-supporting property, and then the gel film obtained was peeled from the stainless steel plate. The gel film was stretched 1.1 times in a first direction and 1.3 times in a second direction vertical to the first direction at 250° C. using a stretcher. Furthermore, the gel film was contracted such that the length in the second direction is 1.2 times the initial length (that is, length before stretching). Thus, a separation membrane was obtained.

The results obtained by evaluating the obtained separation membrane at a treatment temperature of 60° C. are shown in Table 1.

Comparative Examples 1 and 2

PVA was dissolved in distilled water, and alanylglycine was then added such that a mass ratio of the alanylglycine and the PVA is 1:1, followed by stirring to compatibilize those. Thus, a film-forming raw liquid was obtained. The film-forming raw liquid (polymer solution) was cast on a stainless steel plate by an applicator with a coating thickness of 1 mm, and dried at room temperature for 24 hours until a gel film has a self-supporting property at a hot air temperature of 60° C. The gel film obtained was peeled from the stainless steel plate to obtain a separation film.

The results obtained by evaluating the obtained separation membrane at a treatment temperature of 60° C. and 90° C. are shown in Table 1, respectively.

TABLE 1

| | Characteristics of polymer resin | | | | | Separation characteristic | |
| --- | --- | --- | --- | --- | --- | --- | --- |
| | Affinity of carbon dioxide (kcal mol$^{-1}$) | Affinity of removal gas (kcal mol$^{-1}$) | Difference in affinity (kcal mol$^{-1}$) | Diffusibility of removal gas (×10$^{-5}$ cm$^2$s$^{-1}$) | Membrane thickness (μm) | Treatment temperature (° C.) | CO$_2$/He |
| Example 1 | −4.1 | 1.4 | 5.5 | 1.3 | 214 | 60 | 46 |
| Example 2 | −3.6 | 1.9 | 5.5 | 2.1 | 223 | 80 | 51 |
| Example 3 | −2.7 | 2.6 | 5.3 | 3.4 | 216 | 120 | 73 |
| Example 4 | −4.4 | 1.4 | 5.8 | 0.9 | 152 | 60 | 32 |
| Example 5 | −3.8 | 1.1 | 4.9 | 1.3 | 203 | 60 | 28 |
| Example 6 | −4.3 | 1.1 | 5.4 | 1.6 | 223 | 60 | 67 |
| Example 7 | −4.3 | 1.1 | 5.4 | 1.6 | 87 | 120 | 52 |
| Comparative Example 1 | −2.4 | 1.2 | 3.6 | 1.1 | 197 | 60 | 22 |
| Comparative Example 2 | 0.3 | 1.5 | 1.2 | 8.4 | 188 | 120 | 18 |

Although our membranes have been described in detail and by reference to the specific examples, it is apparent to one skilled in the art that various modifications or changes can be made without departing the spirit and scope of this disclosure.

The invention claimed is:

1. A carbon dioxide separation membrane comprising a skin layer having a function of separating carbon dioxide from a mixed gas, wherein the skin layer contains 30 to 90% by mass of a polymer resin in which a difference between an affinity to carbon dioxide and an affinity to at least one of hydrogen and helium, said affinities are expressed as free energy ΔG (kcal mol$^{-1}$), is 4.5 kcal mol$^{-1}$ or more and less than 10 kcal mol$^{-1}$, and from 10 to 70% by mass of an organic liquid having an affinity to carbon dioxide, and the polymer resin is a polyamide having at least one of a repeating unit represented by the Formula (I) and a repeating unit represented by Formula (II):

[I]

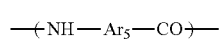

[II]

in which Ar$_3$, Ar$_4$ and Ar$_5$ in Formulae (I) and (II) each are at least one group selected from the group consisting of groups represented by Formulae (III) and (IV):

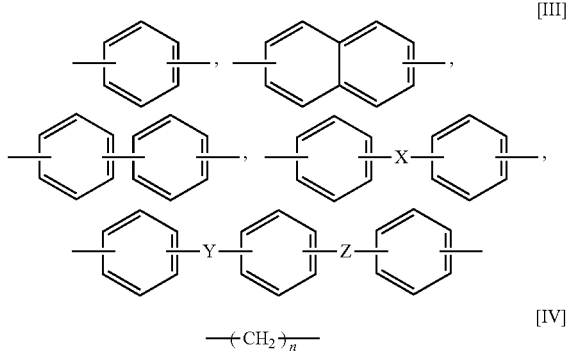

in which X, Y and Z in Formula (III) each are at least one group selected from the group consisting of —O—, —$CH_2$—, —$CO_2$—, —S—, —$SO_2$— and —$C(CH_3)_2$—, and n in Formula (IV) is an integer of from 2 to 8.

2. The membrane according to claim 1, wherein the polymer resin has a diffusion coefficient of the at least one of hydrogen and helium of less than $2.5 \times 10^{-5}$ $cm^2 s^{-1}$.

3. The membrane according to claim 1, wherein the organic liquid is an amine compound.

4. The membrane according to claim 1, wherein the organic liquid is an amine compound having a melamine skeleton.

5. A method of concentrating carbon dioxide comprising causing a mixed gas containing carbon dioxide and at least one of hydrogen and helium to permeate through the carbon dioxide separation membrane according to claim 1.

6. The method according to claim 5, wherein the mixed gas has a temperature of 60° C. or higher.

7. A method of producing the carbon dioxide separation membrane according to claim 1 comprising:
obtaining a film-forming raw liquid by dissolving the polymer resin and the organic liquid in an organic solvent;
forming a membrane from the film-forming raw liquid; and
heat-treating the membrane at 160° C. or higher.

8. The method according to claim 7, further comprising stretching the membrane in a stretching ratio of 1.1 times or more during film formation, after film formation and before heat treatment, or during heat treatment.

9. The method according to claim 8, further comprising contracting the membrane after stretching.

10. The carbon dioxide separation membrane according to claim 1, wherein, in the skin layer, the organic liquid and the polymer resin are compatibilized with each other or in a microphase separation state.

* * * * *